(12) United States Patent
Fischer et al.

(10) Patent No.: US 7,554,757 B2
(45) Date of Patent: Jun. 30, 2009

(54) MAGNETIC STORAGE WRITE HEADS USING MICRO-ELECTRO MECHANICAL SHUTTERS

(75) Inventors: Jonathan H. Fischer, Longmont, CO (US); Roger A. Fratti, Shillington, PA (US); John T. Rehberg, Orefield, PA (US)

(73) Assignee: Agere Systems Inc., Allentown, PA (US)

( * ) Notice: Subject to any disclaimer, the term of this patent is extended or adjusted under 35 U.S.C. 154(b) by 939 days.

(21) Appl. No.: 10/719,655

(22) Filed: Nov. 21, 2003

(65) Prior Publication Data

US 2005/0111127 A1    May 26, 2005

(51) Int. Cl.
G11B 5/02 (2006.01)
(52) U.S. Cl. .............................. 360/55; 360/39; 360/59; 360/123.01; 360/324.12
(58) Field of Classification Search ........................ None
See application file for complete search history.

(56) References Cited

U.S. PATENT DOCUMENTS

| | | | | |
|---|---|---|---|---|
| 5,307,228 A | * | 4/1994 | Grasty | 360/132 |
| 5,448,434 A | * | 9/1995 | Hirose | 360/99.01 |
| 5,500,839 A | * | 3/1996 | Miyake et al. | 369/13.22 |
| 5,701,185 A | * | 12/1997 | Reiss et al. | 358/471 |
| 6,226,116 B1 | * | 5/2001 | Dowe et al. | 359/281 |
| 6,411,596 B1 | * | 6/2002 | Nagatsuka | 720/630 |
| 6,567,349 B2 | * | 5/2003 | Nagata et al. | 369/30.07 |
| 6,667,827 B2 | * | 12/2003 | Ono et al. | 359/281 |
| 6,693,768 B1 | * | 2/2004 | Crue et al. | 360/125.12 |
| 6,731,446 B2 | * | 5/2004 | Ikeda et al. | 360/59 |
| 6,812,055 B2 | * | 11/2004 | Tamura et al. | 438/48 |
| 2002/0097640 A1 | * | 7/2002 | Seo et al. | 369/13.24 |
| 2002/0118477 A1 | * | 8/2002 | Ikeda et al. | 360/55 |

OTHER PUBLICATIONS

Paultre, A.L., "MEMS Shutter Array to Revolutionize Optoelectronices," Electronic Products, http://www.electronicproducts.com/ShowPage asp?SEC, downloaded on Oct. 25, 2006.

* cited by examiner

*Primary Examiner*—Hoa T Nguyen
*Assistant Examiner*—Dismery E Mercedes
(74) *Attorney, Agent, or Firm*—Ryan, Mason & Lewis, LLP

(57) ABSTRACT

A write head for a magnetic storage system energizes a write coil for a plurality of bit intervals and selectively shutters the magnetic field to alter a magnetic domain of a magnetic storage medium for each bit interval. The position of the shutter may be controlled using a micro-electro mechanical system. Magnetic pole segments provide a loop between the write coil and the magnetic storage medium. Magnetic shielding on the shutter mechanisms controls the reflection of the magnetic fields. In a rewritable magnetic storage system, a first write coil generates a positive magnetic field and a second write coil generates a negative magnetic field. A shutter is associated with each write coil to selectively allow the positive or negative magnetic fields to alter the magnetic domain of the magnetic storage medium. The positive or negative magnetic fields can alter the magnetic domain in a collocated region of the magnetic storage medium to avoid jitter.

20 Claims, 4 Drawing Sheets

MAGNETIC STORAGE WRITE HEADS USING MICRO-ELECTRO MECHANICAL SHUTTERS

FIELD OF THE INVENTION

The present invention relates generally to magnetic storage systems, and more particularly, to techniques for reducing voltage spikes in such magnetic storage systems.

BACKGROUND OF THE INVENTION

Magnetic storage systems typically store information on a magnetic storage material, such as a magnetic disk, by controlling the direction of a magnetic field on a portion of the disk associated with a given bit. For example, a magnetic field in a first direction can indicate a first binary value, such as a binary value of zero, while a magnetic field in the opposite direction indicates a second binary value, such as a binary value of one. Generally, the direction of the magnetic field is controlled by controlling the direction of current through an inductive write head in order to change the magnetic domains on the magnetic storage material.

The electromotive force caused by the self inductance of the write head must be overcome. Typically, the self inductance of the write head is overcome using a large current spike, referred to as a "pre-charge," at the beginning of the write cycle. The resulting voltage spike, generally given by the value of the inductance multiplied by the change in current per unit of time, has a finite rise time due to the inductance. Thus, the magnitude of the voltage spike varies in proportion to the change in current per unit of time (i.e., the faster the current change, the larger the voltage spike). The resulting voltage spikes create large traveling waves and overshoot on the current waveforms which travel down the transmission line, reflect back off of the write head and cause unwanted changes to the write current waveforms.

A need therefore exists for a method and apparatus for changing the magnetic domains of a magnetic storage system that mitigates these above-described issues and is useful for high performance magnetic storage systems. A further need exists for techniques for reducing voltage spikes in such magnetic storage systems.

SUMMARY OF THE INVENTION

Generally, a write head is disclosed for a magnetic storage system that energizes a write coil for a plurality of bit intervals and selectively shutters the magnetic field to alter a magnetic domain of a magnetic storage medium for each bit interval. The position of the shutter may be controlled, for example, using a micro-electro mechanical system. Magnetic pole segments are used provide a loop between the write coil and the magnetic storage medium. Magnetic shielding may be optionally implemented using, for example, Nickel (Ni) metallization or Cobalt (Co) deposition on the shutter mechanisms, in order to better control the reflection of the magnetic fields.

In a rewritable magnetic storage system according to the present invention, a first write coil generates a positive magnetic field and a second write coil generates a negative magnetic field. A shutter is associated with each write coil to selectively allow the positive or negative magnetic fields to alter the magnetic domain of the magnetic storage medium. In one embodiment, the positive or negative magnetic fields can alter the magnetic domain in a collocated region of the magnetic storage medium to avoid jitter.

Thus, the present invention provides a method and apparatus for changing the magnetic domains of a magnetic storage system that mitigates the above-described issues caused by voltage spikes and is useful for high performance magnetic storage systems.

A more complete understanding of the present invention, as well as further features and advantages of the present invention, will be obtained by reference to the following detailed description and drawings.

DETAILED DESCRIPTION

Figure 1:
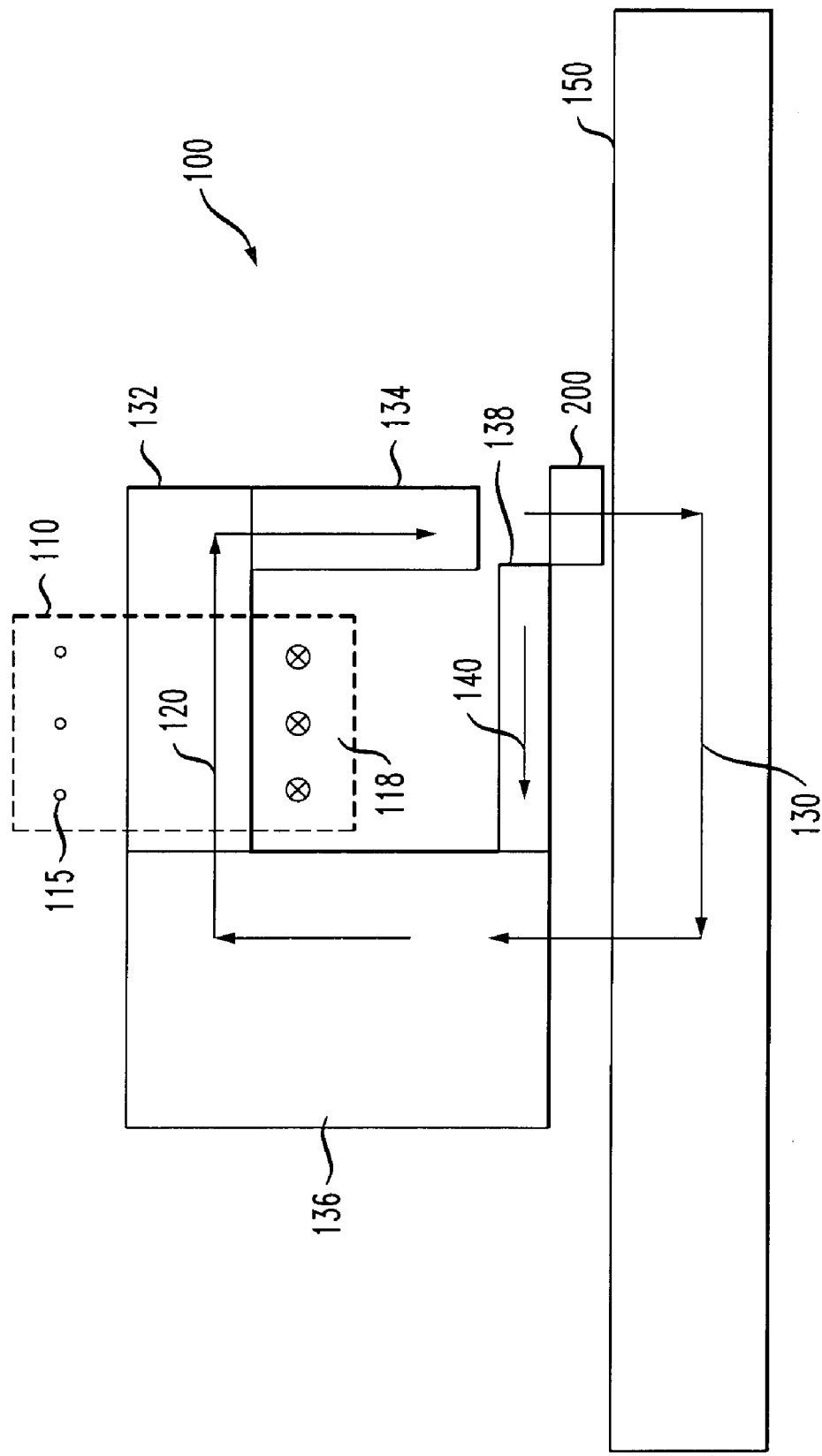
FIG. 1 is a cross sectional view of a write head for a one time programmable magnetic storage system incorporating features of the present invention.

FIG. 1 is a cross sectional view of a write head 100 for a "write once" (or one time programmable) magnetic storage system incorporating features of the present invention. According to one aspect of the invention, the write head includes a write coil 110 that generates a magnetic field. The write coil 110 may be continuously energized whenever the magnetic storage system is operational or may be energized for shorter intervals and maintained for at least a plurality of bit intervals, provided that the write coil reaches steady state before a bit is to be written to the magnetic storage material. As shown in FIG. 1, the write coil 110 includes a wire coil having an orientation such the direction of current is established by a set 115 of arrow heads (out of page) and a set of arrow tails 118 (into page). The direction of the resulting magnetic field 120 is determined in accordance with the well known right hand rule, by controlling the direction of current through the write coil 110. For the exemplary embodiment shown in FIG. 1, the magnetic field 120 is generated in a clock-wise direction. Since the write coil 110 is continuously energized, there is a continuous magnetic field 120 and the voltage spikes associated with conventional designs are not introduced.

According to another aspect of the invention, the path of the magnetic field 120 is controlled by one or more shutters 200 to selectively alter the magnetic domain of a magnetic storage material 150, such as a disk. In an open position of the shutter 200, the magnetic field 120 is allowed to pass the shutter 200 and will follow an outer loop 130 comprised of magnetic material segments 132, 134, 136 and the magnetic storage material 150. In a closed position of the shutter 200, the magnetic field 120 is not allowed to pass the shutter 200 and will follow an inner loop 140 that bypasses the disk 150 and is comprised of magnetic material segments 132, 134, 136 and 138. In this manner, the magnetic domain of the magnetic storage medium 150 is selectively altered based on the position of the shutter 200. For example, the shutter 200 may be positioned in the open position for a write cycle, and a closed position for a non-write cycle.

In one implementation, a narrow vertical pole 134 concentrates the magnetic field 120 for writing to the disk 150. The wide vertical pole 136 is used to spread out the magnetic flux coming back up from the disk 150 when writing the disk. Generally, the wide vertical pole 136 should be wide enough so that the magnetic field 120 cannot overwrite the state of the magnetic domains under it.

Figure 2:
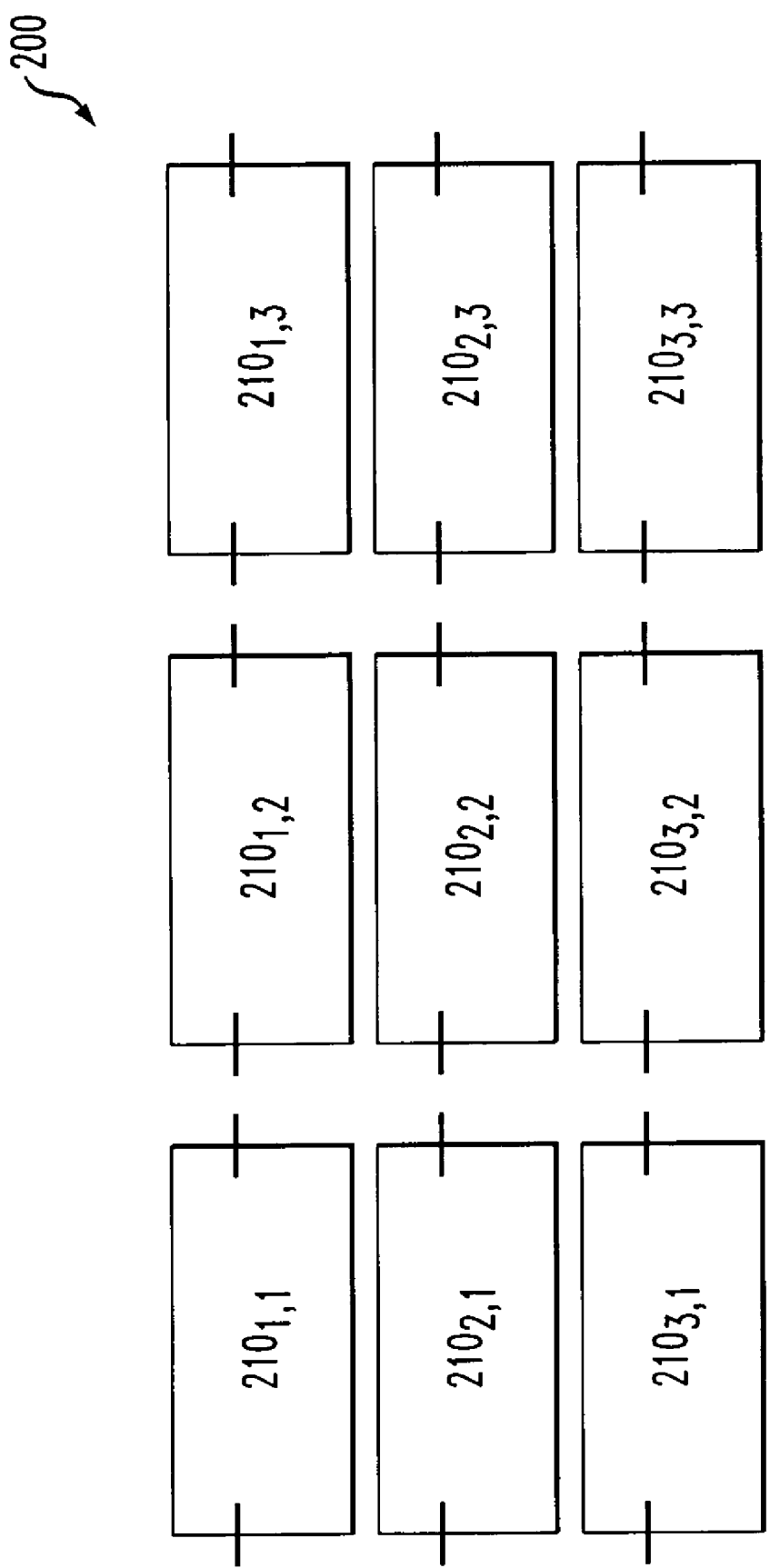
FIG. 2 is a schematic block diagram of an array of shutters of FIG. 1.

FIG. 2 is a schematic block diagram of an array 200 of shutters $210_{ij}$. In the exemplary embodiment, the array 200 consists of three rows and three columns of shutter elements 210. As shown in FIG. 2, each shutter element 210 can pivot across a central axis between an open (not shown) and closed position (shown), in a similar manner to a venetian blind. The position of each shutter element 210 can be controlled, for example, using micro electro mechanical systems (MEMS) or other micromachine control elements. It is noted that micro electro mechanical systems switches are increasingly used for optical networks and other applications. In an optical network application, MEMS switches have been employed, for example, to move a mirror that changes the propagation direction of light, or blocks the light entirely. U.S. Pat. No. 5,974,207, for example, discloses a wavelength-selective add-drop multiplexer that uses movable mirrors to add and/or drop spectral components from a wavelength-division-multiplexed optical signal. Magnetic shielding may be implemented using Nickel (Ni) metallization or Cobalt (Co) deposition on the shutter mechanisms 210. In this manner, when the shutter elements 210 are in a closed position, the magnetic field will be reflected to the inner loop 140.

In a further variation, the shutter elements 210 can selectively be lifted (as opposed to tilted) between an open and closed position to allow the magnetic flux to travel around the individual lifted shutter elements 210. Generally, the write head 100 of FIG. 1 and the shutter 200 of FIG. 2 can write a single bit of information at a given time, generally corresponding to the region of the disk associated with shutter element $210_{2,2}$. Other variations are possible, as would be apparent to a person of ordinary skill. The writing of each bit is synchronized to the rotation of the disk 150, in a known manner.

Figure 3:
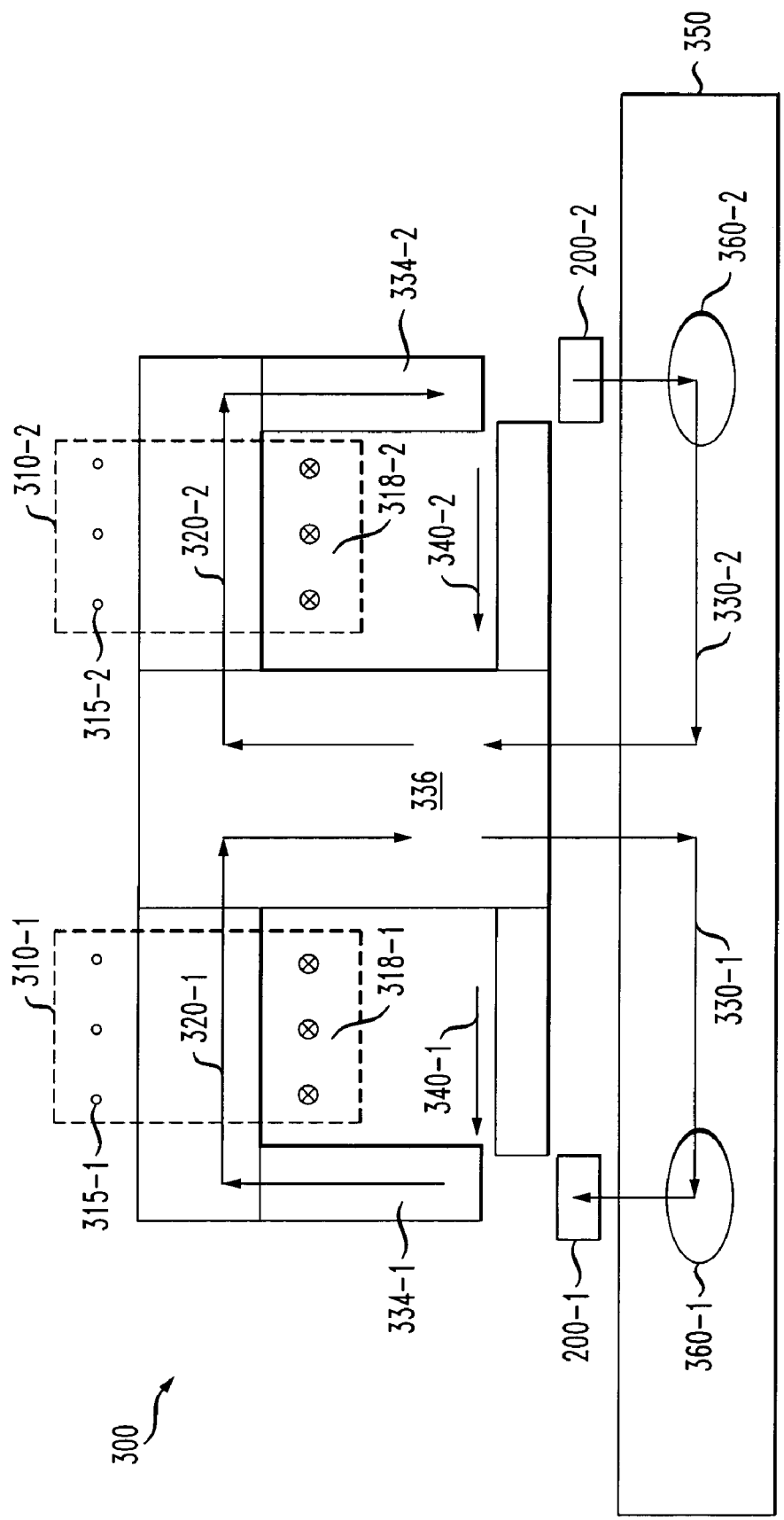
FIG. 3 is a cross sectional view of a write head for a rewritable magnetic storage system incorporating features of the present invention.

As previously indicated, the write head 100 shown in FIG. 1 may be employed in a "write once" magnetic storage system. Generally, the write head 100 may be used to write information to the disk 150, but once written, such information cannot be erased (since the write head 100 can only generate a magnetic field in one direction). FIG. 3 is a cross sectional view of a write head 300 for a rewritable magnetic storage system incorporating features of the present invention. Generally, the rewritable write head 300 includes a first loop for a positive magnetic field (upward taken as +1 for illustration purposes), and a second loop for a negative magnetic field, each having one or more shutters to selectively alter the magnetic domain of the disk 350. In this manner, the write head 300 can reverse the direction of the magnetic field so that a given bit area can be rewritten as a +1 value or a −1 value, independent of the prior state.

The rewritable write head 300 includes first and second continuously energized write coils 310-1 and 310-2 that each generate magnetic fields in a clock-wise direction. As shown in FIG. 3, each write coil 310 includes a wire coil having an orientation such the direction of current is established by a set 315 of arrow heads (out of page) and a set of arrow tails 318 (into page). Since the write coils 310 are continuously energized, there are continuous magnetic fields 320-1 and 320-2 and the voltage spikes associated with conventional designs are not introduced. In the exemplary embodiment, for a given bit location on the disk 350, the first loop associated with the magnetic field 320-1 writes a +1 value to the disk 350 (write mode) while the second loop associated with the magnetic field 320-2 writes a −1 value to the disk 350 (erase mode).

The path of each magnetic field 320 is controlled by a corresponding shutter 200-1, 200-2 to selectively alter the magnetic domain of the disk 150 in corresponding regions 360-1, 360-2. In an open position of the shutters 200-1, 200-2, the corresponding magnetic field 320-1, 320-2 is allowed to pass the corresponding shutter 200-1, 200-2 and will follow an outer loop 330-1, 330-2 that includes the magnetic storage material 350. In a closed position of the shutters 200-1, 200-2, the corresponding magnetic field 320-1, 320-2 is not allowed to pass the corresponding shutter 200-1, 200-2 and will follow an inner loop 340-1, 340-2 that bypasses the disk 350. In this manner, the magnetic domain of the magnetic storage medium 350 is selectively altered in corresponding regions 360-1, 360-2 based on the respective position of shutters 200-1, 200-2.

In the exemplary implementation shown in FIG. 3, a narrow vertical pole 334-1, 334-2 in each loop concentrates the magnetic field 320 for writing to the disk 350. The common wide vertical pole 336 for each loop should be wide enough so that the magnetic field 320 cannot overwrite the state of the magnetic domains under it.

It is noted that the shutters 200-1 and 200-2 in the rewritable write head 300 of FIG. 3 (and the corresponding regions 360-1 and 360-2 that are written on the disk 350) are not collocated. Thus, a time shift is encountered when writing to the disc 350. If it is assumed that the disc 350 rotates from left to right, then to write to a specific bit domain on the disc 350, a −1 value must be delayed compared to a +1 value to account for the time it takes for the disc 350 to move from the + pole piece 334-1 to the − pole piece 334-2. The required time shift limits the maximum write rate.

Figure 4:
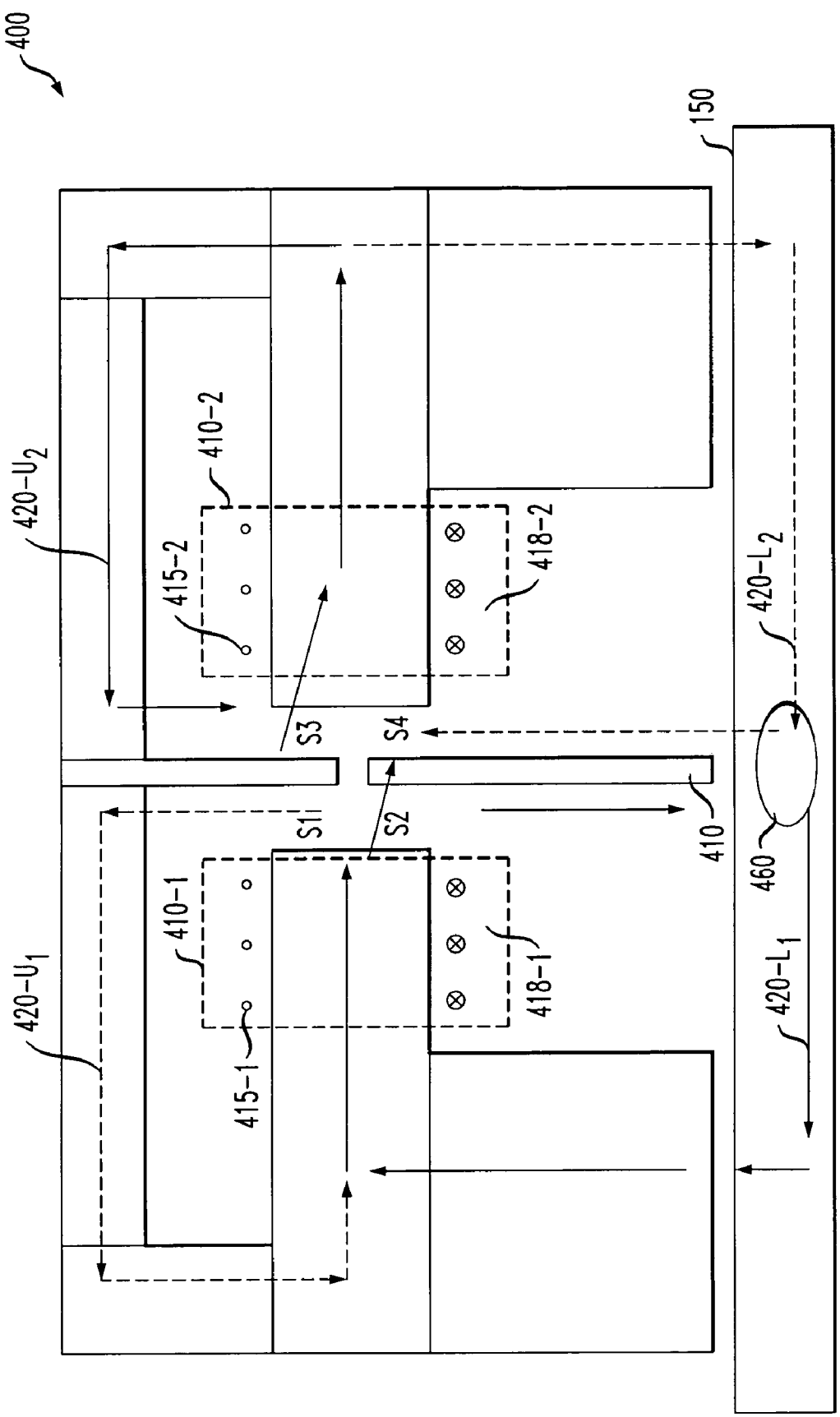
FIG. 4 is a cross sectional view of an alternate write head for a rewritable magnetic storage system incorporating features of the present invention.

FIG. 4 is a cross sectional view of an alternate implementation of a write head 400 for a rewritable magnetic storage system incorporating features of the present invention that allows the positive and negative magnetic field loops to affect a collocated region 460 of a magnetic disk 150 (i.e., values of +1 and −1 are written to the same region 460 of the disk 150). As shown in FIG. 4, an exemplary rewritable write head 400 includes four shutters S1-S4 (magnetic switches) that may each be embodied, for example, as the shutter array 200 shown in FIG. 2. The four shutters S1-S4 allow the magnetic field to be steered so that the magnetic field from a write head 410 is can be either a positive or negative value. As discussed further below, the respective positions of each of the four shutters S1-S4 determines whether a magnetic field generated by a first write coil 410-1 follows a first upper path 420-$U_1$ or a first lower path 420-$L_1$. Similarly, the four shutters S1-S4 determine whether a magnetic field generated by a second write coil 410-2 follows a second upper path 420-$U_2$ or a second lower path 420-$L_2$.

The shutters S1-S4 may be implemented in a similar manner to FIG. 2, where each shutter element 210 pivots across a central axis between an open (not shown) and closed position (shown), similar to a venetian blind. In such an implementation, a value of −1 is written to the disk 150 by enabling the first lower path 420-$L_1$. The first lower path 420-$L_1$ is enabled by opening shutter S2 and closing shutter S1. In addition, the second upper path 420-$U_2$ should be enabled to prevent the simultaneous writing of a value of +1 by opening shutter S3 and closing shutter S4. Similarly, a value of +1 is written to the disk 150 by enabling the second lower path 420-$L_2$. The second lower path 420-$L_2$ is enabled by opening shutter S4 and closing shutter S3. In addition, the first upper path 420-$U_1$ should be enabled to prevent the simultaneous writing of a value of −1 by opening shutter S1 and closing shutter S2.

It is to be understood that the embodiments and variations shown and described herein are merely illustrative of the principles of this invention and that various modifications may be implemented by those skilled in the art without departing from the scope and spirit of the invention.

We claim:

1. A magnetic storage system, comprising:
   at least one write coil to generate a magnetic field for at least a plurality of bit intervals;
   a magnetic storage medium; and
   at least one shutter to selectively allow said magnetic field to alter a magnetic domain of said magnetic storage medium.

2. The magnetic storage system of claim 1, further comprising at least one magnetic pole segment to provide a loop between said at least one write coil and said magnetic storage medium.

3. The magnetic storage system of claim 1, comprising a first write coil to generate a positive magnetic field, a second write coil to generate a negative magnetic field, and at least two shutters to selectively allow said positive or negative magnetic fields to alter said magnetic domain of said magnetic storage medium.

4. The magnetic storage system of claim 3, wherein said positive or negative magnetic fields alter said magnetic domain in a collocated region of said magnetic storage medium.

5. The magnetic storage system of claim 3, further comprising a first set of magnetic pole segments to provide a first loop between said first write coil and said magnetic storage medium and a second set of magnetic pole segments to provide a second loop between said second write coil and said magnetic storage medium.

6. The magnetic storage system of claim 1, wherein a position of said shutter is adjusted using a micro-electro mechanical system.

7. The magnetic storage system of claim 1, wherein at least one of said shutters is coated with a magnetic shielding.

8. The magnetic storage system of claim 7, wherein said magnetic shielding is comprised of Nickel.

9. The magnetic storage system of claim 7, wherein said magnetic shielding is comprised of Cobalt.

10. A method for recording information in a magnetic storage medium, said method comprising the steps of:
    generating a magnetic field for at least a plurality of bit intervals; and
    selectively allowing said magnetic field to alter a magnetic domain of said magnetic storage medium for each bit interval by utilizing a shutter.

11. The method of claim 10, further comprising the steps of generating a positive magnetic field and a negative magnetic field, and selectively allowing said positive or negative magnetic fields to alter said magnetic domain of said magnetic storage medium.

12. The method of claim 11, wherein said positive or negative magnetic fields alter said magnetic domain in a collocated region of said magnetic storage medium.

13. The method of claim 10, wherein said step of selectively allowing said magnetic field to alter a magnetic domain is performed by at least one shutter and said method further comprises the step of adjusting a position of said shutter using a micro-electro mechanical system.

14. A write head for a magnetic storage system, comprising:
    at least one write coil to generate a magnetic field for at least a plurality of bit intervals; and
    at least one shutter to selectively allow said magnetic field to alter a magnetic domain of a magnetic storage medium.

15. The write head of claim 14, further comprising at least one magnetic pole segment to provide a loop between said at least one write coil and said magnetic storage medium.

16. The write head of claim 14, comprising a first write coil to generate a positive magnetic field, a second write coil to generate a negative magnetic field, and at least two shutters to selectively allow said positive or negative magnetic fields to alter said magnetic domain of said magnetic storage medium.

17. The write head of claim 16, wherein said positive or negative magnetic fields alter said magnetic domain in a collocated region of said magnetic storage medium.

18. The write head of claim 16, further comprising a first set of magnetic pole segments to provide a first loop between said first write coil and said magnetic storage medium and a second set of magnetic pole segments to provide a second loop between said second write coil and said magnetic storage medium.

19. The write head of claim 14, wherein a position of said shutter is adjusted using a micro-electro mechanical system.

20. The write head of claim 14, wherein at least one of said shutters is coated with a magnetic shielding.

* * * * *